(12) United States Patent
Ikeda et al.

(10) Patent No.: US 7,235,006 B2
(45) Date of Patent: Jun. 26, 2007

(54) POWER TOOL WITH DUST COLLECTION FUNCTION

(75) Inventors: Tomoya Ikeda, Hitachinaka (JP); Nobuhito Hosokawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/374,069

(22) Filed: Mar. 14, 2006

(65) Prior Publication Data

US 2006/0211351 A1    Sep. 21, 2006

(30) Foreign Application Priority Data

Mar. 15, 2005    (JP) ............................. P2005-073586

(51) Int. Cl.
*B24B 55/06* (2006.01)
(52) U.S. Cl. ........................ 451/456; 451/357; 451/359
(58) Field of Classification Search ................ 451/456, 451/357, 359
See application file for complete search history.

(56) References Cited

U.S. PATENT DOCUMENTS

| | | | |
|---|---|---|---|
| 3,938,283 A * | 2/1976 | Keith, Jr. ..................... | 451/344 |
| 4,355,487 A * | 10/1982 | Maier et al. ................. | 451/357 |
| 4,531,329 A * | 7/1985 | Huber ......................... | 451/456 |
| 5,419,737 A * | 5/1995 | Brazell et al. ............... | 451/453 |
| 6,224,471 B1 * | 5/2001 | Clowers et al. ............. | 451/359 |
| 6,758,731 B2 | 7/2004 | Dutterer et al. | |
| 2004/0132393 A1* | 7/2004 | Reich et al. ................. | 451/456 |

FOREIGN PATENT DOCUMENTS

| | | |
|---|---|---|
| JP | 06-226709 | 8/1994 |
| JP | 09-254033 | 9/1997 |
| JP | 2003-053654 | 2/2003 |

* cited by examiner

*Primary Examiner*—Eileen P. Morgan
(74) *Attorney, Agent, or Firm*—Antonelli, Terry, Stout & Kraus, LLP.

(57) ABSTRACT

A power tool with a dust collection function has a motor, a dust collection fan, and a cover member. The dust collection fan is driven by the motor for collecting a dust. The cover member covers the dust collection fan. The cover member provides an air passage surrounding the dust collection fan in a circumferential direction of the dust collection fan. The cover member is configured and arranged to provide a lower pressure section and another section in the air passage when the dust collection fan rotates. The lower pressure section provides a lower static pressure than the another section. Accordingly, the power tool ensures highly efficiency for collecting a dust particle.

8 Claims, 5 Drawing Sheets

POWER TOOL WITH DUST COLLECTION FUNCTION

BACKGROUND OF THE INVENTION

1. Technical Field

The present invention relates to a power tool with a dust collection function. In particular, the present invention relates to a sander or a cutter having a dust collection function.

2. Related Art

Various types of power tools with a dust collection function have been proposed, such as those described in Japanese patent application publications Nos. HEI-6-226709, HEI-9-254033, and 2003-053654.

Generally, a random orbital sander includes a housing, and a motor accommodated in the housing. The motor has an output shaft extending downward from the motor. A centrifugal fan is mounted on the lower end of the output shaft. The centrifugal fan is covered about its periphery by a fan cover formed continuously from the housing. A switch for turning a power supply to the motor on and off is accommodated in an upper section of the housing.

The centrifugal fan is integrally configured of a cooling fan disposed on the upper side, and a dust collection fan disposed on the lower side. An eccentric shaft is formed integrally with the centrifugal fan at a boss part thereof and is offset a prescribed amount from the axial center of the output shaft. A base pad is mounted on the eccentric shaft via a bearing and is attached to the centrifugal fan by a plurality of screws. The base pad is penetrated by a plurality of dust collection holes. Sandpaper is detachably mounted on the bottom surface of the base pad.

An air passage is formed between an inner periphery of the fan cover and an outer periphery of the dust collection fan. A dust exhaust duct is formed integrally with part of the fan cover. The dust exhaust duct includes a dust outlet in fluid communication with the air passage. A collection bag is attached to the dust exhaust duct.

When the switch is switched on to power the motor, the motor begins driving the output shaft to rotate. At this time, the centrifugal fan mounted on the output shaft is driven to rotate, while the base pad supported on the eccentric shaft of the centrifugal fan via the bearing begins to move in a random orbit. Hence, the sandpaper mounted on the base pad moving in a random orbit can be applied to sand a workpiece. Dust particles that are generated during the sanding process are drawn into the air passage formed in the fan cover through the plurality of dust collection holes formed in the base pad by an airflow generated by the rotating dust collection fan. The dust particles are carried along the air passage, discharged through the dust outlet of the dust exhaust duct, and collected in the collection bag. At the same time, the rotating cooling fan generates an airflow for cooling the motor in order to suppress heat generation.

It is desired that the above power tools provides improved efficiency to collect dust particles.

In view of the foregoing, an object of the present invention is to provide a power tool with a dust collection function improving efficiency of dust collection.

SUMMARY

The present invention provides a power tool having a dust collection function having a motor, a dust collection fan, and a cover member. The dust collection fan is driven by the motor for collecting a dust. The cover member covers the dust collection fan. The cover member provides an air passage surrounding the dust collection fan in an circumferential direction of the dust collection fan. The cover member is configured and arranged to provide a lower pressure section and another section in the air passage when the dust collection fan rotates. The lower pressure section provides a lower static pressure than the another section.

BRIEF DESCRIPTION OF THE DRAWINGS

The aforementioned aspects and other features of the invention are explained in the following description, taken in connection with the accompanying drawing figures wherein.

DESCRIPTION OF THE EMBODIMENTS

A power tool with a dust collection function according to embodiments of the present invention will be described while referring to FIGS. 1–5. In the following description, the expressions "front", "rear", "above", "below", "upper", "lower", "upward", and "downward" are used throughout the description to define the various parts when the power tool is disposed in an orientation in which it is intended to be used.

Figure 1:
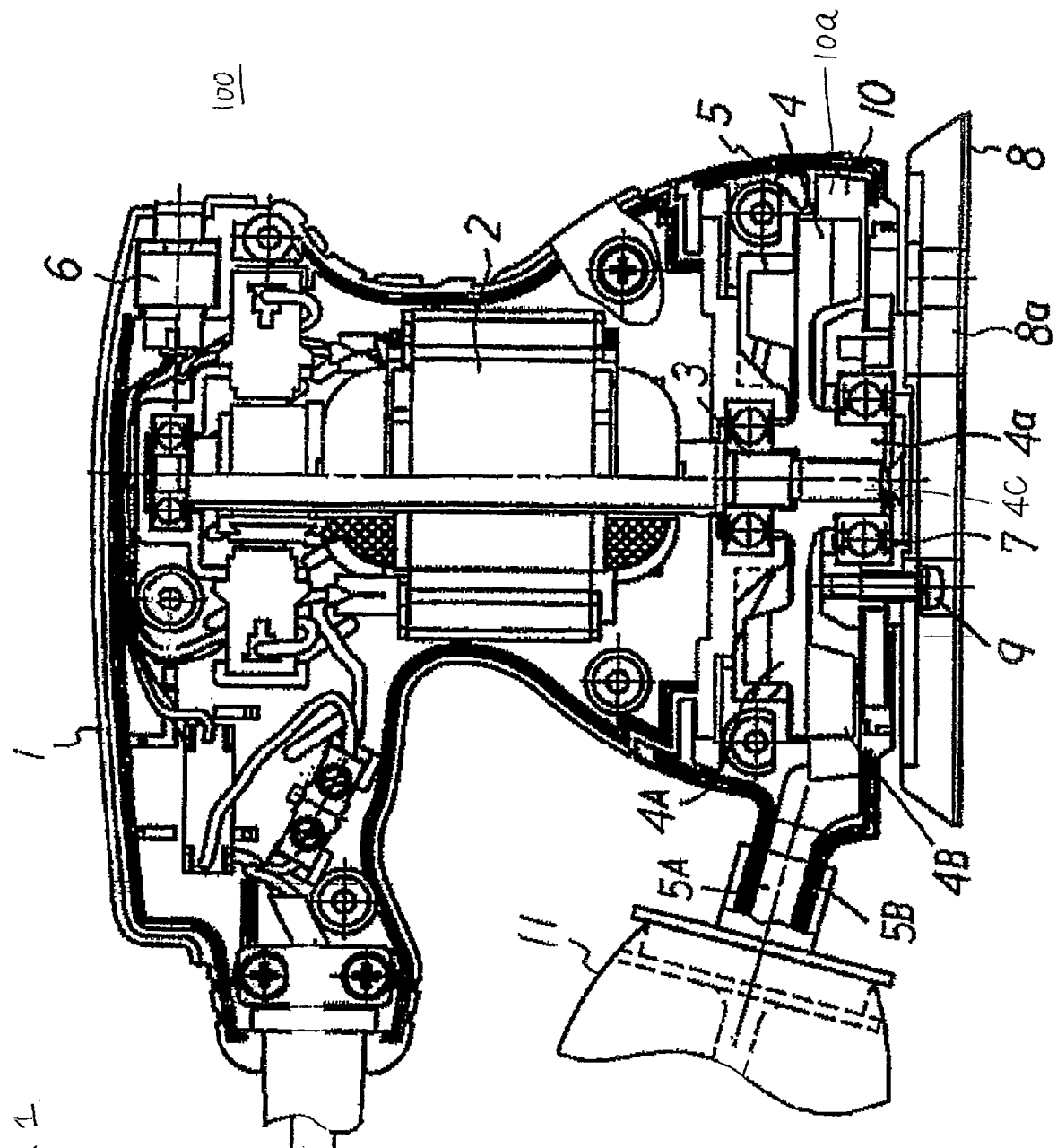
FIG. 1 is a vertical cross-sectional view showing a random orbital sander with a dust collection function according to a first embodiment of the present invention.

FIG. 1 illustrates a random orbital sander 100 of a first embodiment according to the present invention. As shown in FIG. 1, the random orbital sander 100 includes a housing 1, and a motor 2 accommodated in the housing 1 in order that an output shaft 3 thereof is oriented to extend downward from the motor 2. A centrifugal fan 4 is mounted on the lower end of the output shaft 3. The centrifugal fan 4 has a peripheral portion covered with and surrounded by a fan cover 5 formed continuously from the housing 1. A switch 6 for turning on and off a power supply to the motor 2 is accommodated in an upper section of the housing 1.

The centrifugal fan 4 is integrally configured of a cooling fan 4A disposed on the upper side, and a dust collection fan 4B disposed on the lower side. The centrifugal fan 4 has a rotational shaft 4C coupled coaxially to the output shaft 3 of the motor 2. The centrifugal fan 4 is driven by the motor 2 to rotate. An eccentric shaft 4a is formed integrally with the centrifugal fan 4 at a boss part thereof and is offset a prescribed distance from the axial center of the output shaft 3.

A base pad 8 is mounted on the eccentric shaft 4a through a bearing 7 to be attached to the centrifugal fan 4 by a plurality of screws 9 (only one of the screws is shown in FIG. 1). The base pad 8 is penetrated by a plurality of dust collection holes 8a (only one hole is shown in FIG. 1). Sandpaper (not shown) is detachably mounted on a lower surface of the base pad 8.

Figure 2:
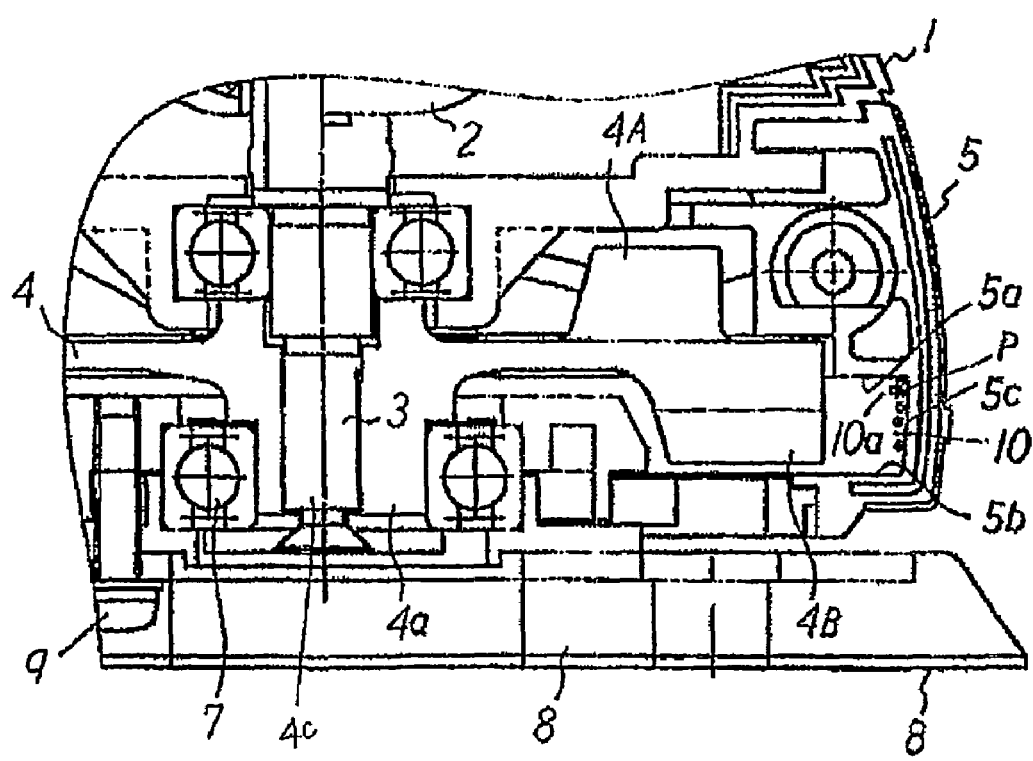
FIG. 2 is an enlarged partial cross-sectional view showing the random orbital sander of FIG. 1.

As shown in FIG. 2, the fan cover 5 has an upper inner surface 5a, a lower inner surface 5b, and an inner peripheral surface 5c connecting the upper and lower inner surfaces 5a and 5b. The upper inner surface 5a, the lower inner surface 5b, and the inner peripheral surface 5c define the air passage 10 formed inside the fan cover 5. Thus, the air passage 10 is provided to surround the dust collection fan 4B in a circumferential direction thereof so that an opening of the air passage 10 faces the dust collection fan 4B. Accordingly, the air passage 10 has an annular cross section in a direction substantially perpendicular to the rotational shaft 4C. Simultaneously, the air passage 10 has a substantially rectangular cross section between the inner upper surface 5a and the inner lower surface 5c in a direction of the rotational shaft 4C.

Particularly, the inner peripheral surface 5c extends in the substantially same direction as a longitudinal direction of the rotational shaft 4C to face the dust collection fan 4a with an air gap therebetween. The inner peripheral surface 5c is inclined or tapered with respect to the rotational shaft 4C by a prescribed amount of angle. In this embodiment, the inner peripheral surface 5c slopes radially outward from the rotational shaft 4C in an upward direction. In other words, the edge of the upper inner surface 5a is positioned away from the edge of the lower inner surface 5b with respect to the rotational shaft 4C.

A larger radius part 10a is consequently formed in a corner region of the air passage 10 at which the inner peripheral surface 5c intersects the upper surface 5a. The larger radius part 10a surrounds the dust collection fan 4B in the circumferential direction thereof in the air passage 10. The inner peripheral surface 5c in the larger radius part 10a is located from the rotational shaft 4C by a longer distance than inner peripheral surface 5c in the remaining part other than the larger radius part 10a in the air passage 10.

A dust exhaust duct 5B is formed integrally with part of the fan cover 5. The dust exhaust duct 5B includes a dust outlet 5A in fluid communication with the air passage 10. A collection bag 11 for depositing a dust is attachable to the dust exhaust duct 5B.

Further, the larger radius part 10a forming part of the air passage 10 and the dust outlet 5A are positioned at substantially the same distance from the lower surface of the base pat 8. That is, the larger radius part 10a and the dust outlet 5A lie in the substantially same plane which is substantially perpendicular to the rotational shaft 4C.

The operation of the random orbital sander 100 will be described as follows. When the switch 6 is switched on to power the motor 2, the motor 2 begins driving the output shaft 3 to rotate. At this time, the centrifugal fan 4 mounted on the output shaft 3 is driven to rotate, while the base pad 8 supported on the eccentric shaft 4a of the centrifugal fan 4 via the bearing 7 begins to move in a random orbit. Hence, the sandpaper mounted on the base pad 8 moving in a random orbit can be applied to sand a workpiece (not shown). As shown in FIG. 2, dust particles P that are generated during the sanding process are drawn into the air passage 10 formed in the fan cover 5 through the plurality of dust collection holes 8a formed in the base pad 8 by an airflow generated by the rotating dust collection fan 4B. The dust particles P are carried along the air passage 10, discharged through the exhaust outlet 5A of the dust exhaust duct 5B, and collected in the collection bag 11. At the same time, the rotating cooling fan 4A generates an airflow for cooling the motor 2 in order to suppress heat generation.

During the operation of the random orbital sander 100, a pressure in this larger radius part 10a is lower than the remaining part of the air passage 10, because the distance from the rotational shaft 4C of the dust collection fan 4B to the inner peripheral surface 5c is longer than the distance from the rotational shaft 4C to the inner peripheral surface 5c in the remaining part of the air passage 10.

In other words, the rate of airflow that the dust collection fan 4B generates in the larger radius part 10a is faster than the rate of airflow of the remaining part of the air passage 10, because the larger radius part 10a has a longer radius than the remaining part of the air passage 10. Accordingly, the dynamic pressure in the larger radius part 10a increases, while the static pressure drops by a level equal to this increased dynamic pressure, resulting in a lower pressure (static pressure) in the larger radius part 10a (corner region) than in the remaining part of the air passage 10, as described above.

When dust particles P are generated during a sanding process, the rotating dust collection fan 4B generates an airflow that draws these dust particles P into the air passage 10 formed in the fan cover 5 via the plurality of dust collection holes 8a in the base pad 8. In this embodiment, since the inner peripheral surface 5c of the fan cover 5 is a sloped surface that forms the larger radius part 10a in part of the air passage 10, as described above, the dust particles P introduced into the air passage 10 accumulate in the larger radius part 10a, as shown in FIG. 2, which part has a lower pressure than the pressure of the remaining part of the air passage 10. Therefore, the dust particles P are not scattered in an even vertical distribution as in a conventional random orbital sander. As a result, the dust particles P accumulated in the larger radius part 10a of the air passage 10 can be discharged in clusters through the dust outlet 5A of the dust exhaust duct 5B and efficiently collected in the collection bag 11, ensuring highly efficient dust collection.

Further, since the dust outlet 5A of the fan cover 5 and the larger radius part 10a of the air passage 10 are positioned at substantially the same height from the lower surface of the base pad 8 in this embodiment, the dust particles P accumulated in the larger radius part 10a of the air passage 10 smoothly and efficiently pass through the dust outlet 5A without deviating from the dust outlet 5A, thereby depositing in the collection bag 11. Accordingly, the above structure of the random orbital sander 100 contributes to higher efficiency of dust collection.

Next, a random orbital sander 100 according to a second embodiment of the present invention will be described with reference to FIG. 3. Since the basic structure and operations of the random orbital sander 100 according to the present invention are identical to those of the random orbital sander of the first embodiment, a description of the structure and operations will not be repeated in this embodiment. Further, like parts and components in the random orbital sander shown in FIGS. 1 and 2 are designated with the same reference numerals as those in FIG. 3.

Figure 3:
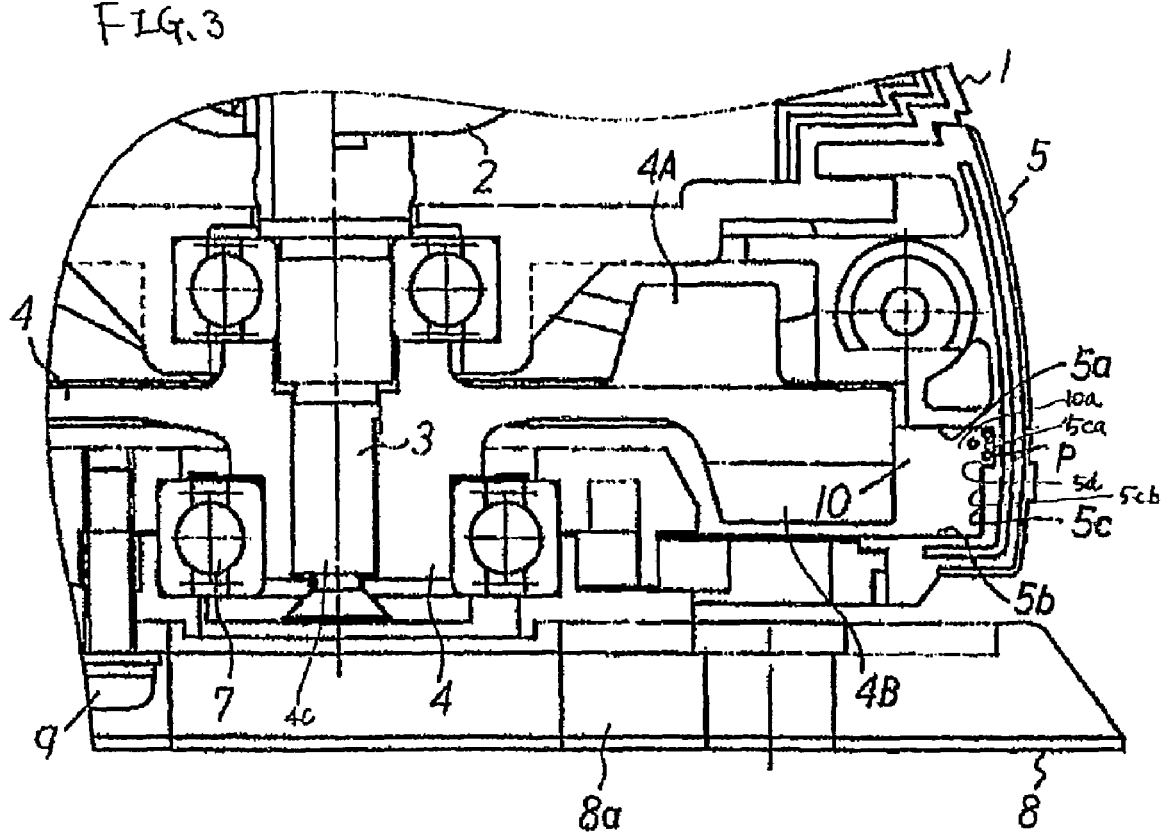
FIG. 3 is an enlarged and partial cross-sectional view showing a random orbital sander according to a second embodiment.

Referring to FIG. 3, the fan cover 5 is configured of an upper inner surface 5a, a lower inner surface 5b, and an inner peripheral surface 5c that define the air passage 10, similarly to those of the first embodiment. However, the inner peripheral surface 5c has two vertical inner surfaces 5ca, 5cb which extend parallel to the rotational shaft 4C of the dust collection fan 4B. Especially, a step 5d is formed at a joint portion of two vertical inner surfaces 5ca, 5cb in proximity to a corner region of the air passage 10 at which the inner peripheral surface 5c intersects the upper inner surface 5a. The distance between the vertical inner surfaces 5ca and the rotational shaft 4C is longer than the distance between the vertical inner surfaces 5cb and the rotational shaft 4C. Accordingly, the air passage 10 between the dust collection fan 4B and the vertical inner surfaces 5ca provides the larger radius part 10a. Further, the larger radius part 10a is formed at substantially the same height from the lower surface of the base pat 8 as that of the dust outlet 5A (see FIG. 1).

Hence, in the random orbital sander of this embodiment, dust particles P introduced into the air passage 10 during a sanding process accumulate in the larger radius part 10a, because the larger radius part 10a has a lower pressure than that the remaining part of the air passage 10. The accumulated dust particles P are efficiently discharged through the dust outlet 5A, thereby being collected in the collection bag 11 (see FIG. 1). Accordingly, the above structure of the air passage 10 ensures highly efficient dust collection.

In addition, since the larger radius part 10a of the air passage 10 is positioned at substantially the same height from the lower surface of the base pad 8 as the dust outlet 5A of the fan cover 5, dist particles P collected in the larger raduis part 10a are smoothly discharged therethrough without deviating from the dust outlet 5A, thereby being collected in the collection bag 11. Accordingly, the above structure of the random orbital sander 100 achieves higher efficiency of dust collection.

Next, a random orbital sander 100 according to a third embodiment of the present invention will be described with reference to FIG. 4. Since the basic structure and operations of the random orbital sander 100 according to the present invention are identical to those of the random orbital sander of the first embodiment, a description of the structure and operations will not be repeated in this embodiment. Further, like parts and components in the random orbital sander shown in FIGS. 1 and 2 are designated with the same reference numerals as those in FIG. 4.

Figure 4:
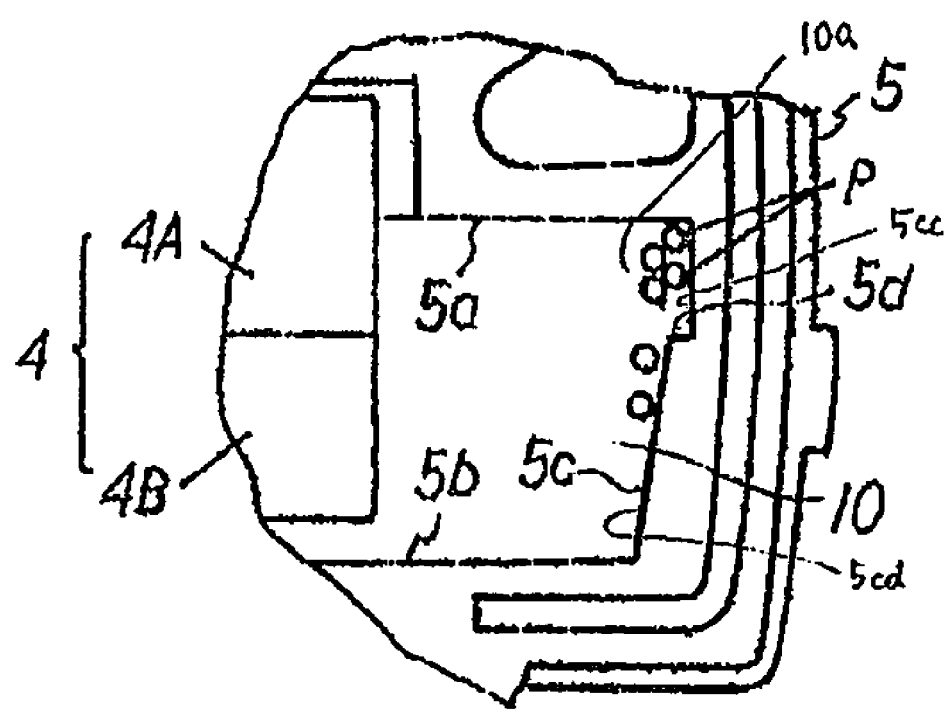
FIG. 4 is a partial cross-sectional view illustrating an air passage of a random orbital sander according to a third embodiment.

Referring to FIG. 4, the upper inner surface 5a, the lower inner surface 5b, and the inner peripheral surface 5c define the air passage 10. Particularly, the inner peripheral surface 5c includes two surfaces: a vertical inner surface 5cc at an upper position and a sloped inner surface 5cd at a lower position. The vertical inner surface 5cc and a sloped inner surface 5cd are connected through a step 5d which is formed in proximity to the corner region of the air passage 10 at which the inner peripheral surface 5c intersects the upper surface 5a. The vertical inner surface 5cc is positioned away from the sloped inner surface 5cd with respect to the rotational shaft 4C. The larger radius part 10a of the air passage 10 is provided between the dust collection fan 4B and the vertical inner surface 5cc. In this embodiment, the larger radius part 10a is positioned at substantially the same height from the lower surface of the base pad 8 as the dust outlet 5A (see FIG. 1)

Hence, in the random orbital sander 100 according to this embodiment, dust particles P introduced into the air passage 10 during a sanding process accumulate in the larger radius part 10a, because the pressure in the larger radius part 10a is lower than that in the remaining part of the air passage 10. The above structure of the random orbital sander 100 ensures a high efficiency of dust collection for the same reasons as those of the first and second embodiments.

Figure 5:
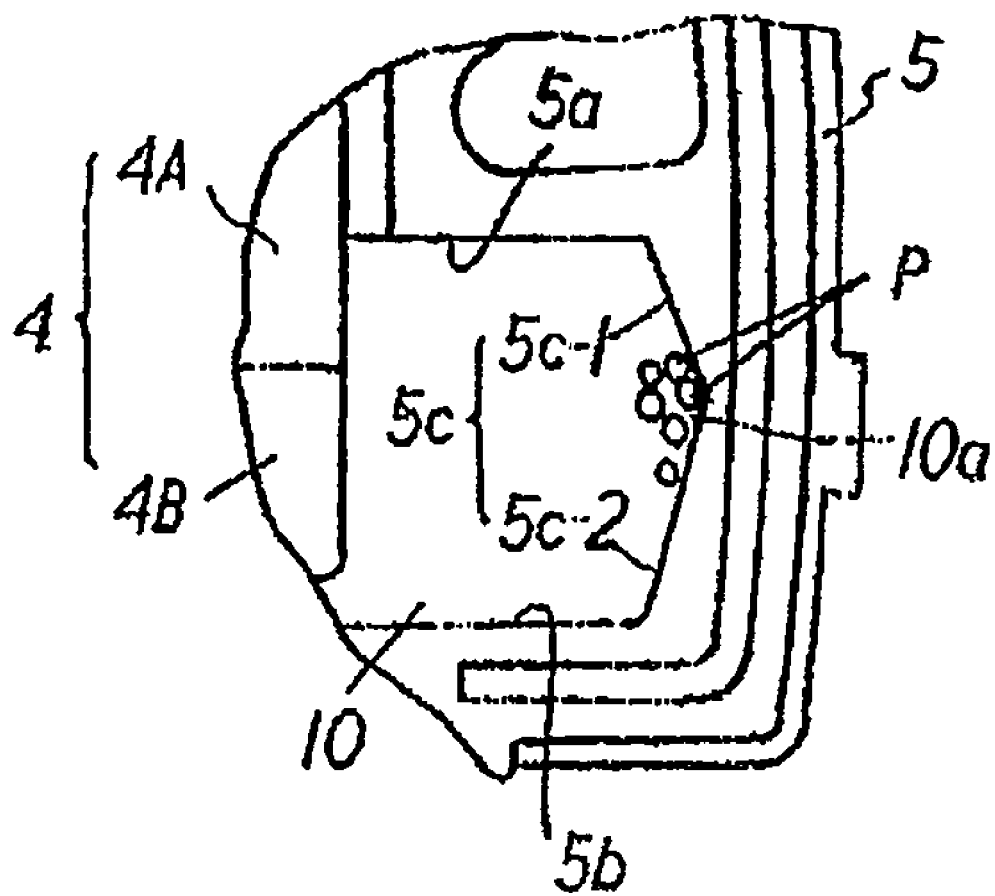
FIG. 5 is a partial cross-sectional view illustrating an air passage of a random orbital sander according to a fourth embodiment.

Next, a random orbital sander 100 according to a fourth embodiment of the present invention will be described with reference to FIG. 5. Since the basic structure and operations of the random orbital sander 100 according to the present invention are identical to those of the random orbital sander of the first embodiment, a description of the structure and operations will not be repeated in this embodiment. Further, like parts and components in the random orbital sander shown in FIGS. 1 and 2 are designated with the same reference numerals as those in FIG. 5.

In the random orbital sander 100 according to this embodiment, the inner peripheral surface 5c of the fan cover 5 is configured of two sloped surfaces 5c-1 and 5c-2 that slope in different directions. The larger radius part 10a of the air passage 10 is formed in the region at which the sloped surface 5c-1 intersects the sloped surface 5c-2, because the intersecting point of the two sloped surfaces 5c-1 and 5c-2 is the most far position from the rotational shaft 4C. In this embodiment, the larger radius part 10a is positioned at substantially the same height as the dust outlet 5A (see FIG. 1).

Hence, in the random orbital sander 100 according to this embodiment, dust particles P introduced into the air passage 10 during a sanding process accumulate in the larger radius part 10a, because the pressure in the larger radius part 10a is lower than that in the remaining part of the air passage 10. The above structure of the random orbital sander 100 ensures high efficiency of dust collection for the same reasons as the previous embodiments described above.

As described above, dust particles introduced into the air passage are collected in the larger radius part of the air passage where pressure is lower and are not scattered throughout the air passage, thereby ensuring dust collection with high efficiency.

In addition, dust particles accumulated in the larger radius part of the air passage can be smoothly discharged through the dust outlet and collected in the collection bag without deviating from the dust outlet, thereby ensuring dust collection of a higher efficiency.

In addition to the random orbital sander described above, the present invention can be similarly applied to a cutter or any other power tool having a dust collection function.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A power tool having a dust collection function comprising:
    a motor;
    a dust collection fan driven by the motor for collecting dust and disposed between the motor and a base pad of the power tool; and
    a cover member for covering the dust collection fan, the cover member providing an air passage surrounding the dust collection fan in a circumferential direction of the dust collection fan and in a radially outward direction of a plane of blades of the dust collection fan, wherein
    the cover member is configured and arranged so as to provide a first section and a second section in the air passage when the dust collection fan rotates, the first section having a static pressure which is lower than a static pressure of the second section, and the first section having the lower static pressure being arranged closer to the motor than the second section.

2. The power tool as claimed in claim 1, wherein the dust collection fan has a rotational shaft, and
    the cover member has an inner surface facing the dust collection fan so as to form a part of the air passage, the inner surface being inclined with respect to the rotational shaft so as to provide the first section having the lower static pressure, a distance from the rotational shaft to the inner surface in the first section having the lower static pressure being longer than a distance from the rotational shaft to the inner surface in the second section.

3. The power tool as claimed in claim 1, wherein the dust collection fan has a rotational shaft, and the cover member has an inner surface facing the dust collection fan so as to form a part of the air passage, the inner surface being stepped along a direction parallel to the rotational shaft so as to at least provide the first section having the lower static pressure, a distance from the rotational shaft to the inner surface in the first section having the lower static pressure being longer than a distance from the rotational shaft to the inner surface in the second section.

4. The power tool as claimed in claim 1, wherein the cover member has a dust outlet in fluid communication with the air passage, the first section having the lower static pressure and the dust outlet lying in a same plane which extends in a direction substantially perpendicular to the rotational shaft.

5. The power tool as claimed in claim 4, further comprising a collection bag attachable to the dust outlet for collecting the dust.

6. A power tool having a dust collection function comprising:

a motor;

a dust collection fan driven by the motor for collecting dust and disposed between the motor and a base pad of the power tool, the dust collection fan having a rotational shaft; and a cover member for covering the dust collection fan having an upper inner surface, a lower inner surface and an inner peripheral surface connecting the upper and lower surfaces, the cover member providing an air passage surrounding the dust collection fan in a circumferential direction of the dust collection fan and in a radially outward direction of a plane of blades of the dust collection fan;

wherein the inner peripheral surface of the cover member has a larger radius part and another part the larger radius part of the inner peripheral surface being disposed closer to the motor than the another part of the inner peripheral surface, a distance between the rotational shaft and the larger radius part of the inner peripheral surface in a substantially perpendicular direction to the rotational shaft is longer than a distance between the rotational shaft and the another part of the inner peripheral surface in the substantially perpendicular direction;

wherein the cover member has a dust outlet in fluid communication with the air passage, the larger radius part of the inner peripheral surface and the dust outlet lying in a same plane which extends in the substantially perpendicular direction to the rotational shaft.

7. A power tool having a dust collection function comprising:

a motor;

a dust collection fan driven by the motor for collecting dust and disposed between the motor and a base pad of the power tool; and a cover member for covering the dust collection fan having an upper inner surface, a lower inner surface and an inner peripheral surface connecting the upper and lower surfaces, the cover member providing an air passage surrounding the dust collection fan in a circumferential direction of the dust collection fan and in a radially outward direction of a plane of blades of the dust collection fan, the upper inner surface of the cover member being disposed closer to the motor than the lower inner surface of the cover member;

wherein the inner peripheral surface is inclined or tapered with respect to a rotational shaft of the motor so that a distance between the rotational shaft and the inner peripheral surface in a substantially perpendicular direction to the rotational shaft is longest at a corner defined by the upper inner surface and the inner peripheral surface than at a distance between the rotational shaft and portions of the inner peripheral surface away from the corner in the substantially perpendicular direction.

8. The power tool as claimed in claim 7, wherein the cover member has a dust outlet in fluid communication with the air passage, the corner defined by the upper inner surface and the inner peripheral surface and the dust outlet lying in a same plane which extends in the substantially perpendicular direction to the rotational shaft.

* * * * *